US009154915B2

(12) United States Patent
Fabrikant et al.

(10) Patent No.: US 9,154,915 B2
(45) Date of Patent: Oct. 6, 2015

(54) APPARATUS AND METHOD FOR ASCERTAINING THE OPERATING HOURS OF A BUSINESS

(71) Applicant: GOOGLE Inc., Mountain View, CA (US)

(72) Inventors: Alexander Fabrikant, East Palo Alto, CA (US); Gueorgi Kossinets, San Francisco, CA (US)

(73) Assignee: Google Inc., Mountain View, CA (US)

( * ) Notice: Subject to any disclaimer, the term of this patent is extended or adjusted under 35 U.S.C. 154(b) by 289 days.

(21) Appl. No.: 13/863,888

(22) Filed: Apr. 16, 2013

(65) Prior Publication Data

US 2015/0172864 A1    Jun. 18, 2015

(51) Int. Cl.
*H04W 24/00* (2009.01)
*H04W 4/02* (2009.01)
*H04W 64/00* (2009.01)

(52) U.S. Cl.
CPC ............... *H04W 4/023* (2013.01); *H04W 4/02* (2013.01); *H04W 4/025* (2013.01); *H04W 64/00* (2013.01)

(58) Field of Classification Search
CPC ....... H04W 4/02; H04W 4/023; H04W 4/025; H04W 64/00
USPC ............ 455/456.1, 456.2, 456.6, 456.3, 411, 455/404.1
See application file for complete search history.

(56) References Cited

U.S. PATENT DOCUMENTS

| | | | |
|---|---|---|---|
| 2006/0244657 A1 | 11/2006 | Soliman | |
| 2009/0024546 A1 | 1/2009 | Ficcaglia et al. | |
| 2009/0325606 A1 | 12/2009 | Farris | |
| 2011/0010422 A1 | 1/2011 | Bezancon et al. | |
| 2012/0330722 A1 | 12/2012 | Volpe et al. | |
| 2013/0033385 A1 | 2/2013 | Gueziec | |
| 2013/0046602 A1* | 2/2013 | Grigg et al. ................ 705/14.25 |
| 2013/0060110 A1 | 3/2013 | Lynn et al. | |
| 2013/0144665 A1 | 6/2013 | Denker et al. | |
| 2013/0145293 A1 | 6/2013 | Yoakum et al. | |
| 2013/0173633 A1 | 7/2013 | Piepgrass et al. | |
| 2013/0191388 A1* | 7/2013 | Bernhardt et al. ............ 707/737 |
| 2014/0213304 A1* | 7/2014 | Beckett et al. ............. 455/456.6 |
| 2014/0372420 A1* | 12/2014 | Slep .............................. 707/724 |

FOREIGN PATENT DOCUMENTS

| | | |
|---|---|---|
| GB | 2333838 A | 8/1999 |
| WO | 2010040883 A1 | 4/2010 |

OTHER PUBLICATIONS

Bellotti, et al., "Activity-Based Serendipitous Recommendations with the Magitti Mobile Leisure Guide", Apr. 5-10, 2008, pp. 1157-1166.

* cited by examiner

*Primary Examiner* — Khai M Nguyen
(74) *Attorney, Agent, or Firm* — Dority & Manning, P.A.

(57) ABSTRACT

Provided is a process and system for ascertaining the operating hours of a business. The process includes obtaining wireless-environment data indicative of the location of business and a timestamp; determining that a user device is located at the business responsive to both the wireless-environment data and wireless-environment data from checked-in user devices that have checked-in to the business via a social network; storing the timestamp in a timestamp data store; estimating operating hours of the business responsive to stored timestamps; and storing the estimated operating hours in a business-hours data store.

24 Claims, 5 Drawing Sheets

US 9,154,915 B2

APPARATUS AND METHOD FOR ASCERTAINING THE OPERATING HOURS OF A BUSINESS

BACKGROUND OF THE INVENTION

1. Field of the Invention

The present invention relates generally to businesses' hours of operation and, more specifically, to ascertaining businesses' hours of operation based on data indicating the presence of customers at the businesses.

2. Description of the Related Art

Many search engines and other online services rely on, and document, business hours—daily, weekly, or monthly patterns of when a business is open—but this information is expensive to obtain on a web-scale. Contacting every business in, for example, the United States to inquire about their hours would be very labor intensive, particularly if the process is regularly repeated to detect changes in business hours. At the same time, records of business hours are often relied upon by users of search engines, so incorrect records can be inconvenient to the user. Accordingly, there is a need for a relatively low-cost, accurate technique for identifying the operating hours of businesses.

SUMMARY OF THE INVENTION

The following is a non-exhaustive listing of some aspects of the present techniques. These and other aspects are described in the following disclosure.

In some aspects, the present techniques include a process, system, and non-transitory machine-readable medium for ascertaining the operating hours of a business. Ascertaining the operating hours includes, in some aspects, obtaining wireless-environment data indicative of the location of business and a timestamp indicative of when the wireless-environment data was obtained from one or more wireless signals, the wireless-environment data being indicative of a wireless environment near premises of a business; determining that a user device is located at the business responsive to both the wireless-environment data and wireless-environment data from checked-in user devices that have checked-in to the business via a social network; storing the timestamp in a timestamp data store, the timestamp data store also storing a plurality of timestamps indicative of times at which other user devices were at the business; estimating operating hours of the business responsive to the stored timestamps; and storing the estimated operating hours in a business-hours data store.

BRIEF DESCRIPTION OF THE DRAWINGS

The above-mentioned aspects and other aspects of the present techniques will be better understood when the present application is read in view of the following figures in which like numbers indicate similar or identical elements.

Figure 1:
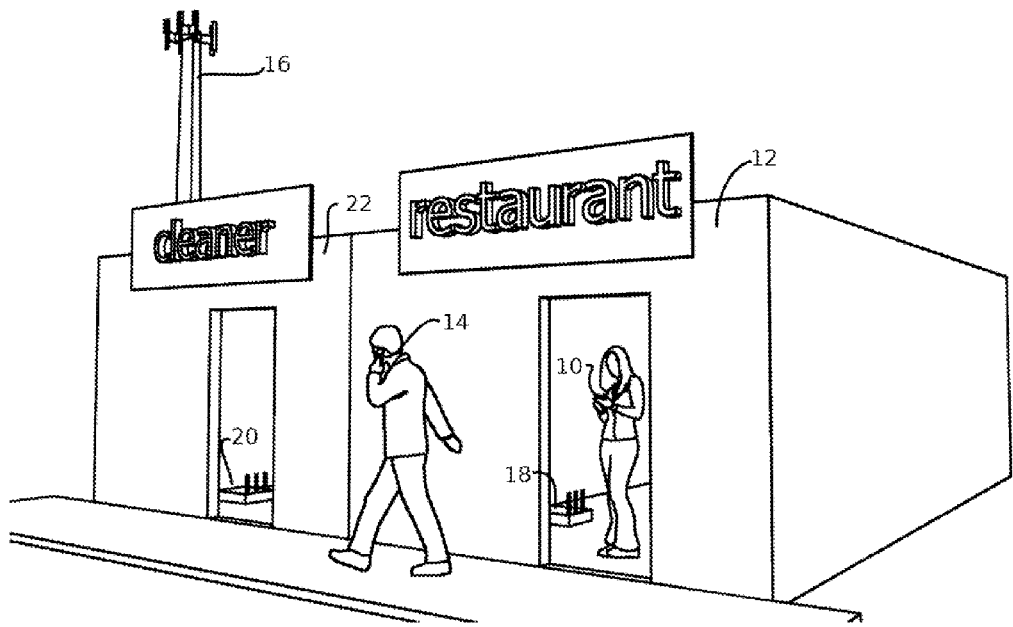
FIG. 1 shows an exemplary scenario that yields data by which business hours are detected.

While the invention is susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION OF CERTAIN EMBODIMENTS

Some embodiments estimate operating hours of businesses based on wireless-environment data from customers' smartphones or other portable user devices. The wireless-environment data indicates the location of the user devices, and when such devices regularly indicate that they are at a business at a certain time, the business is likely open at that time. These indications (called "presence indicators"), however, often falsely indicate that a business is open, because the identified location is inaccurate or because the user device is carried by a non-customer. To reduce location errors, parameters by which location is estimated are refined based on a training set of wireless-environment data from user devices checked-in to businesses. Further, to reduce the effect of errant presence indicators, the indicators are weighted or filtered according to criteria described below.

Embodiments estimate a user device's location based on the wireless environment—such as Global-Positioning System (GPS) signals, cellular signals or wireless access point signals—by triangulating the device's location from such signals. This estimation process is refined with check-in data from social networks (e.g., Google+, Foursquare, or other services by which a user indicates their location, such as payment-network transactions). The check-in data and associated wireless-environment data is used to teach the embodiment how to calculate location more accurately (e.g., with machine-learning techniques) and, then, the trained embodiment estimates location from wireless-environment data obtained in scenarios in which the check-in data is not available.

Once user devices are determined to be at a business at certain times, these presence indicators are filtered or weighted to remove or weight instances based on whether the presence indicator is likely to be indicative of business hours:

1) Presence indicators are discounted based on the speed of the user device. A smartphone moving at nearly constant 5 mph for 7 blocks is likely being carried by a person walking past a business, not a customer.

2) Persistent presence indicators (e.g., those arising from the phones of employees) are down-weighted.

3) Presence indicators from unlikely operating hours (e.g., from cell phones of night-shift janitorial staff) are down-weighted. Likely operating hours are estimated based on business category (e.g., dry cleaners are rarely open at 3 a.m., while many bars are open late).

4) Presence indicators linked by a social network (e.g., a group of friends visiting a bar) are up-weighted for certain business categories (e.g., bars and restaurants).

Finally, operating hours are estimated based on the times at which the weighted-filtered presence indicators indicate a user devices are likely on the premises of the business. To estimate hours for a given business, embodiments group presence indicators by day of the week (e.g., the last 10 Mondays to estimate Monday hours), discarding holidays, and determine the business's operating hours based on changes in the number of presence indicators occurring at the opening and the closing of the business.

In situations in which the systems discussed here collect personal information about users, or may make use of personal information, the users may be provided with an opportunity to control whether programs or features collect user information (e.g., information about a user's social network, social actions or activities, preferences, or current location), or to control whether and/or how such information is used (e.g., to provide content that may be more relevant to the user). In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user, stored, and used by a content server.

FIG. 1 shows an exemplary scenario yielding data by which business hours are detected. In FIG. 1, a user device 10 is carried by a user within a business 12, and another user device 14 is carried by another user walking near the business 12. In this scenario, existing techniques have proven unreliable for accurately distinguishing between the location of device 10 at the business 12 and the device 14 near the business. The user devices 10 and 14 include radios by which attributes of the wireless environment of the devices 10 and 14 are detected, and location is estimated from these attributes, referred to as "wireless-environment data."

Wireless-environment data characterizes the wireless environment, which may include signals from GPS satellites, a cell tower 16, a wireless access point 18 within the business 12, and a wireless access point 20 within an adjacent business 22. Wireless-environment data may include identifiers of wireless transmitters in range of the user device, such as cellular tower identifiers, service set identifiers of wireless access points, or other public identifying aspects of the wireless transmitter. In some cases, wireless-environment data includes signal strength, signal reflection arrival times and reflected signal strengths.

Thus, the user devices 10 and 14 receive wireless-environment data that is generally indicative of their location. This information is captured and sent to components described below to ascertain which, if any, business the user devices are located within, and resulting presence indicators are aggregated by day of the week to ascertain the operating hours of businesses.

Figure 2:
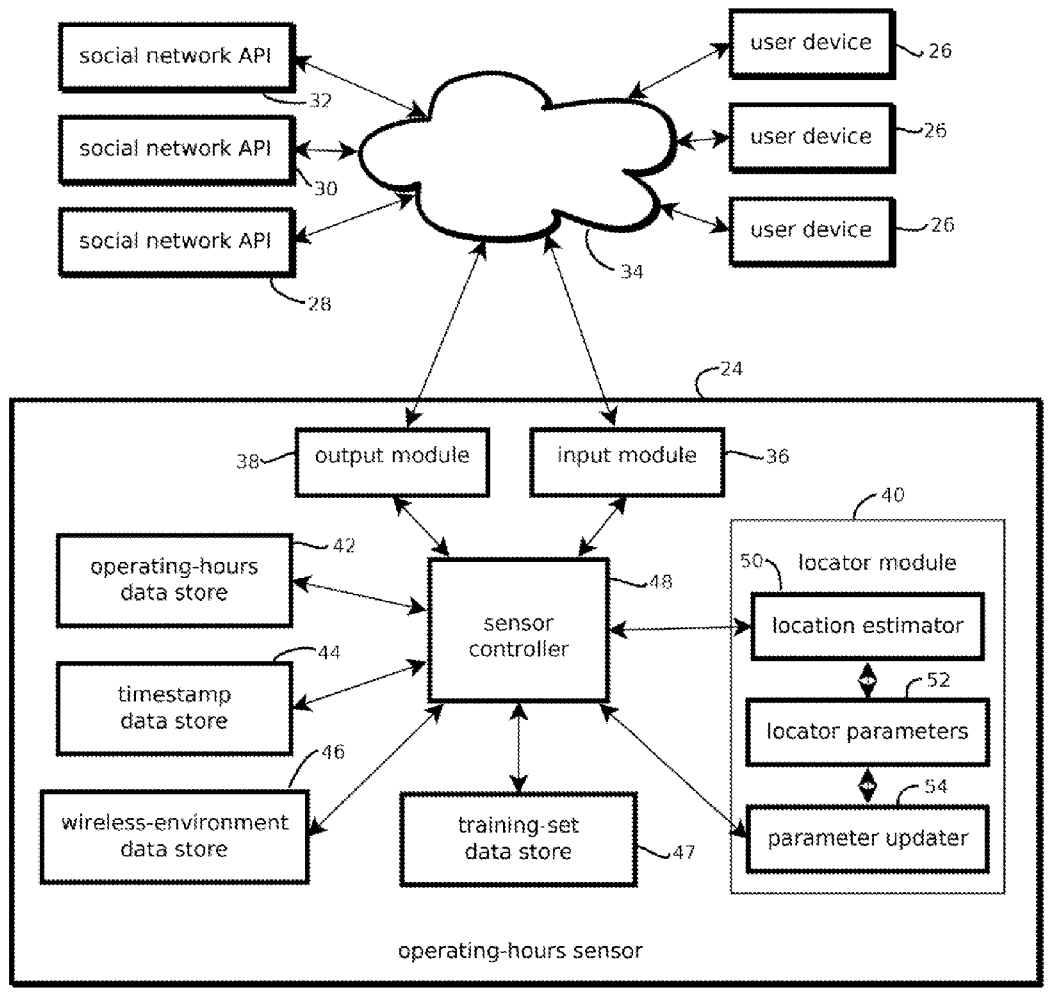
FIG. 2 shows an embodiment of an operating-hours sensor.

FIG. 2 illustrates an embodiment of an operating-hours sensor 24 that estimates operating hours of a business based on the above-described data from user devices 10 and 14. Hours are inferred from the location of user devices at various times, and location is inferred from the wireless-environment data. Embodiments refine the location inferences based on a training set having wireless-environment data from user devices associated with check-ins that confirm the presence of the user device at a business near when the wireless-environment data was acquired.

The illustrated operating-hours sensor 24 receives data from several sources. In some embodiments, user devices 10, 14, and 26 execute a background process that polls their radios, stores some or all of the wireless-environment data acquired via the radios, and transmits the wireless-environment data to the operating-hours sensor 24, along with an identifier of the device 10 or 14, and a timestamp indicative of when the wireless-environment data was acquired. The user devices 10, 14, and 26 may detect the wireless-environment data periodically, for instance once every 15 minutes, and transmit the collected data periodically, for instance once a day, to the operating-hours sensor 24. Further, the operating-hours sensor 24 receives check-in data from social network application programming interfaces (APIs) 28, 30, and 32. Data is exchanged with the operating-hours sensor 24 via a network 34, such as the Internet.

In some embodiments, the operating-hours sensor 24 includes an input module 36 that receives the above-mentioned data via the network 34 and an output module 38 that transmits data, such as queries to APIs 28, 30, and 32, via network 34. Embodiments also include a locator module 40, an operating-hours data store 42, a timestamp data store 44, a wireless-environment data store 46, and a training-set data store 47. Each of these modules 36, 38, 40, 42, 44, 46, and 47 exchanges data with a sensor controller 48 that coordinates the operation of the operating-hours sensor 24.

The locator module 40, in some embodiments, includes a location estimator 50, locator parameters 52, and a parameter updater 54, each of which communicate with one another and the sensor controller 48. The location estimator 50, when instructed to do so by the sensor controller 48, estimates the location of a user device based on wireless-environment data from the user device and stored in the wireless-environment data store 46. The estimate is based on locator parameters 52, which in some embodiments are parameters of a machine learning module embodying the locator module 40, such as software or hardware executing a neural network, a support vector machine, a self organizing map, a clustering algorithm (e.g., K-means), or a Bayesian classifier. Location may be expressed as an identifier of a business in which the user device is located or as coordinates, such as latitude and longitude known to be within a business's premises.

At the instruction of the sensor controller 48, the parameter updater 54 refines the parameters 52 with supervised learning techniques. To this end, the sensor controller 48 retrieves for parameter updater 54 training data from the training-set data store 47. Using this input, the parameter updater 54 refines the locator parameters 52 by, for example, executing a training routine that adjusts the parameters 52 based on differences between an estimated location from the location estimator 50 (estimated from the retrieved wireless-environment data of a training record) and a known location from the check-in data. Thus, the check-in data and the corresponding wireless-environment data serve as a training set for supervised learning by the locator module 40. Refining parameters 52 based on the training set is expected to improve the accuracy of the location estimator 50 in cases in which check-in data is not available.

The operating-hours data store 42 stores a plurality of records, each record identifying a business and estimated operating hours of the business. The estimated operating hours are supplied by the sensor controller 48, which estimates operating hours using processes described below with reference to FIGS. 3 and 4. The operating-hours data store 42, in some cases, is connected to, or mirrored by, various systems that identify the operating hours of businesses for users, such as local search engines, web-based maps, social networks, and listings of businesses for recording customer reviews.

Operating hours are inferred from the data in the timestamp data store 44, which stores a plurality of presence-indicator records, each record identifying at least a business, and a time at which a user device was at the business according to an estimated location of the user device or a check-in of the user device. In some embodiments, the record may also include an identifier of the user device, which may be anonymized, for example by using an arbitrarily selected value that is periodically discarded to reduce the likelihood of the value being associated with an individual based on accumulated data sufficiently specific to identify the individual.

Location is inferred from the data in the wireless-environment data store 46, which includes a plurality of wireless-data records, each record identifying at least a wireless-environment data from a user device, and a timestamp indicating when the user device acquired the wireless-environment data. In some embodiments, the record may also include an identifier of the user device, which may be suitably anonymized as described above.

The algorithm by which location is inferred from the wireless-environment data is trained using data in the training-set data store 47, which stores a plurality of training records, each record having wireless environment data (an "input vector") paired with a business identifier (an "answer vector"). The business identifier is obtained from check-ins identified by the social network APIs 28, 30, and 32 in response to requests from controller 48. The business identifier is paired with wireless-environment data obtained at approximately the same time as when the check-in occurred (as is also identified by APIs 28, 30, and 32). For instance, the business identifier may be paired with wireless-environment data obtained within a threshold time after the check-in, such as less than 30 minutes after the check-in, or in use cases where the check-in is a financial transaction, the threshold may select wireless-environment data from some period before the transaction, such as within 30 minutes prior.

The sensor controller 48, in some embodiments, coordinates the operation of the other components of the operating-hours sensor 24 in order to estimate business hours. The illustrated sensor controller 48 instructs the modules 36 and 38 to request, receive, and transmit the above-described exchanges with other devices via the network 34. Further, the sensor controller 48 populates the timestamp data store 44 by retrieving records from the wireless-environment data store 46, instructing the locator module 40 to estimate the location of users devices at various times based on the retrieved records, and storing the results as records in the timestamp data store 44. In another operation, the sensor controller 48 updates the operating-hours data store 42 based on the records in the timestamp data store 44 by detecting decreases in the number of presence indicators at certain times on certain days of the week, e.g., using the process described below with reference to FIG. 4. Further, in some embodiments, the sensor controller 48 from time to time (e.g., periodically) coordinates training of the locator module 40 by retrieving training records and instructing the parameter updater 54 to update the locator parameters 52 based on this data. The updated parameters are expected to yield relatively accurate location estimates, which are expected to yield relatively accurate estimates of operating hours, which is not to suggest that embodiments are limited to systems that offer these benefits, as various engineering tradeoffs may be made in accordance with the present techniques to improve other aspects of system performance.

The operating-hours sensor 24 may be embodied as hardware, software, or combinations thereof. For example, the operating-hours sensor 24 may be embodied as one or more properly programmed processors executing instructions stored in memory (coupled to the processors) for providing the functionality described herein. And in some embodiments, some or all of this functionality may be expressed by code stored on a tangible non-transitory machine-readable medium. Further, it should be noted that the block diagrams herein are merely exemplary, and while the components above are described as discrete modules, code or hardware by which these components are implemented may be intermingled, combined, divided, co-located, distributed, or otherwise differently organized.

Figure 3:
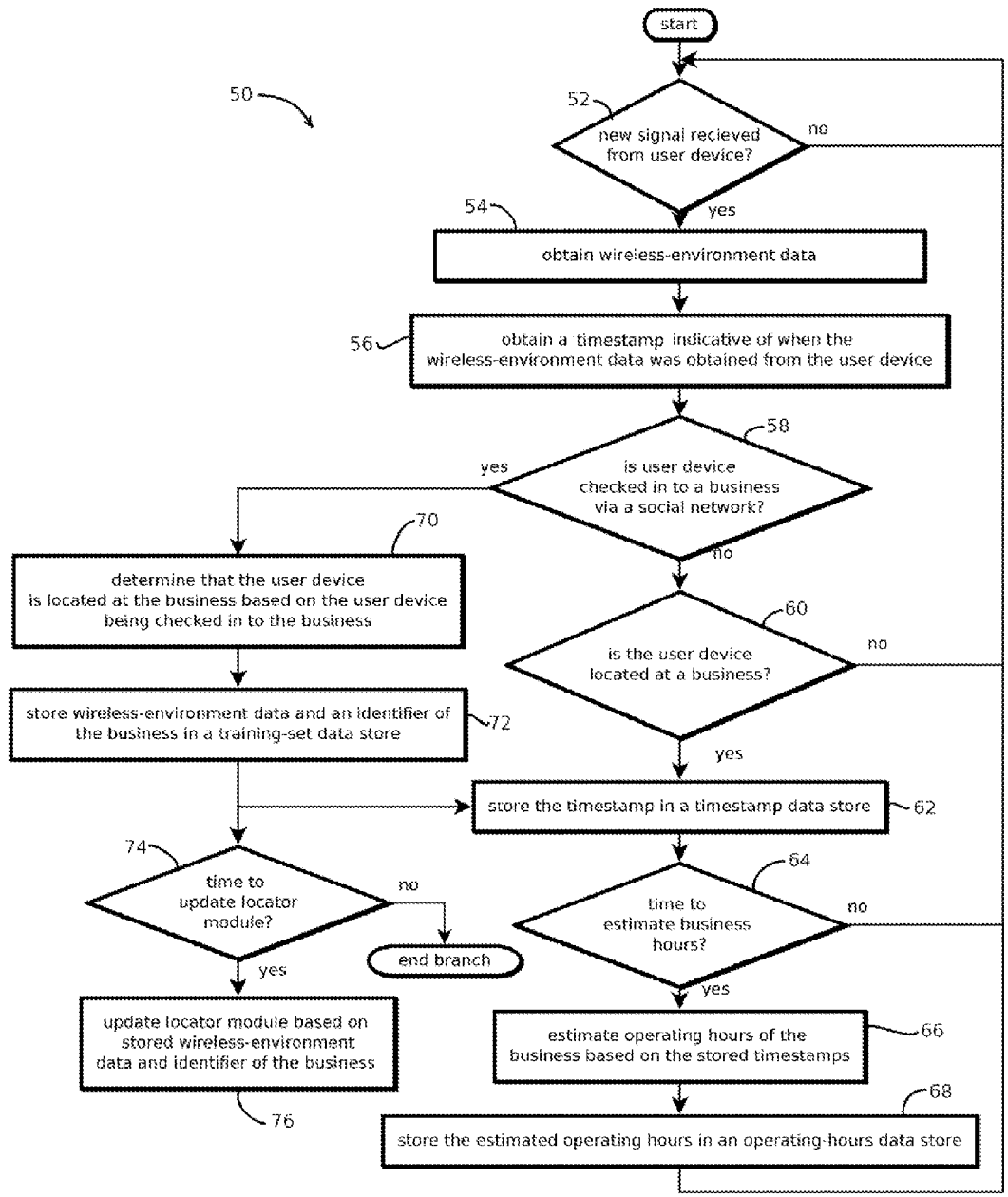
FIG. 3 shows an embodiment of a process for detecting the operating hours of a business.

FIG. 3 illustrates an embodiment of a process 50 for estimating the operating hours of businesses based on the presence of user devices at the businesses. In process 50, the presence of user devices at businesses is inferred based on the wireless environment experienced by the user devices, and the accuracy of the inference is refined over time with check-ins to the businesses. Resulting presence indicators are used to estimate operating hours of the businesses. In some embodiments, the process 50 is performed by the operating-hours sensor 24 of FIG. 2. The process 50 may be performed periodically, for example nightly, in order to refine records within an operating-hours data store, or the process 50 may be performed in response to the acquisition of some amount of new data indicative of operating hours.

In some embodiments, the process 50 begins with determining whether a new signal has been received from a user device, as indicated by decision block 52. Arrival of a new signal may be indicated by the presence of an as yet unprocessed record within the wireless-environment data store 46 (FIG. 2). Absent a new signal, the process 50 waits for new signal or is terminated until the next run of process 50.

In response to a new signal, the process 50 proceeds to obtain wireless-environment data associated with the new signal, as indicated by block 54. This data may be obtained from the wireless-environment data store 46 (FIG. 2) in the form of one of the above-mentioned records of this data store 46.

Next, embodiments include obtaining a timestamp indicative of when the wireless-environment data was obtained by the user device, as indicated by block 56. The data may be obtained from the wireless-environment data store 46 of FIG. 2.

Next, embodiments of process 50 determine whether the user device is checked in to a business via a social network, as indicated by decision block 58. Step 58 may include retrieving data from the social network APIs 28, 30, and 32 of FIG. 2 to determine whether a check-in occurred within a threshold time of when wireless-environment data was obtained by the user device. This step may be performed by the sensor controller 48 of FIG. 2. Check-ins may also include data indicative of other forms of transactions that indicate the presence of a user at a business. Examples include financial transaction data generated by transactions by the user at the business (e.g., credit card transactions), mentions of the business in user-generated content detected with natural-language processing (e.g., a blog or social network post stating "I just got to Bob's restaurant, waiting for my food"), or a calendar entry in an online interactive user-specific calendar indicating an appointment at the business (e.g., a calendar item or a "yes" event RSVP for an event tagged with that business as a location).

In response to determining that the user device is not checked in to a business, the process 50 determines whether the user device is located at a business, as shown by block 60. The determination may be performed by locator module 40 of FIG. 2 and is based on the wireless-environment data from the user device. Determining location includes determining at which, if any, business the user device is located. In response to determining that the user device is not located at any business (for which hours are estimated), the process 50 returns to step 52. Alternatively, in response to determining that the user device is at a business, the timestamp is stored, as indicated by block 62, in the timestamp data store 44 of FIG. 2, in a record that associates the timestamp with the business. The timestamps, in some embodiments, are also associated with device identifiers (which may be used to determine later whether the specific device belongs to a customer or an employee) and information about the amount of confidence that the device belongs to someone currently at the business, e.g., a confidence value that is a function of wireless environment data readings (e.g. a GPS signal would typically give much higher confidence than triangulation based on cell tower signal strengths).

Next, the process 50 determines whether the appropriate time has arrived to estimate business hours, as indicated by block 64. This time may be selected based on the amount of accumulated unprocessed timestamps stored in step 62, or the time may be based on some duration, such as once a day, or complaints from users that a record of a business's hours is inaccurate. In response to a negative result in step 64, the process 50 returns to step 52. In response to determining that it is time to estimate operating hours, the process 50 proceeds to do so based on the stored timestamps, as indicated by block 66. Estimating the operating hours of the business, in some embodiments, includes performing a process described below with reference to FIG. 4.

Upon estimating the operating hours, the process 50 proceeds to store the estimated operating hours in an operating-hours data store, as indicated by block 68, such as the data store 42 of FIG. 2. The process 50 then returns to determine whether additional new signals have been received from user devices in decision block 52. Thus, process 50 estimates the operating hours of businesses by accumulating timestamps from when user devices are at the business, as inferred based on the wireless environment seen by the user devices, and analyzing the timestamps to infer when the businesses open and close.

The process 50, in some embodiments, further includes a branch by which location estimation parameters are adjusted based on check-ins and associated (e.g., paired) wireless-environment data. As noted above, estimating location of a user device solely based on its wireless environment is often relatively inaccurate. In some embodiments, the accuracy of the estimate is improved by observing the wireless environment of user devices known to be at a given business in virtue of another, more reliable indicator, such as check-ins to the business. User devices experiencing a similar wireless environment to that of a checked-in user device are likely to be at the same business. Accordingly, pairs of check-ins and wireless-environment data serve as a training set for machine learning algorithms that ascertain location based on wireless-environment data when check-in data is absent. Applying the trained algorithm to check-in-less wireless-environment data, in essence, compares this data to the check-in wireless-environment data and matches similar signatures.

In decision block 58, upon determining that the user device is checked into a business via a social network, the process 50 determines that the user device is located at the business, as indicated by block 70. Further, the process 50 stores wireless-environment data from the user device and an identifier of the business in the training-set data store 47 (FIG. 2), as indicated by block 72.

At this stage, the process 50 proceeds both to decision block 62 and to decision block 74, for example in different threads, processes, or branches of code, executing concurrently or consecutively. In decision block 74, it is determined whether the appropriate time has arrived to update parameters of the locator module by which location is ascertained in step 60. Location estimation parameters may be updated periodically or in response to the accumulation of some amount of data upon which to base the update. In response to determining that the appropriate time has not arrived, the present branch of process 50 terminates. Alternatively, the process 50 updates the parameters of the locator module based on the stored wireless-environment data and the identifier of the business, as indicated by block 76. The stored data is retrieved from the training-set data store 47, at the direction of sensor controller 48, for use by the parameter updater 54 (each of which being shown in FIG. 2). As noted above, updating these parameters may include updating a machine learning module with supervised learning based on a stored training set. Updating the locator parameters 52 (FIG. 2) is expected to yield more accurate location estimates in step 60 than systems that do not make use of such a training set.

Figure 4:
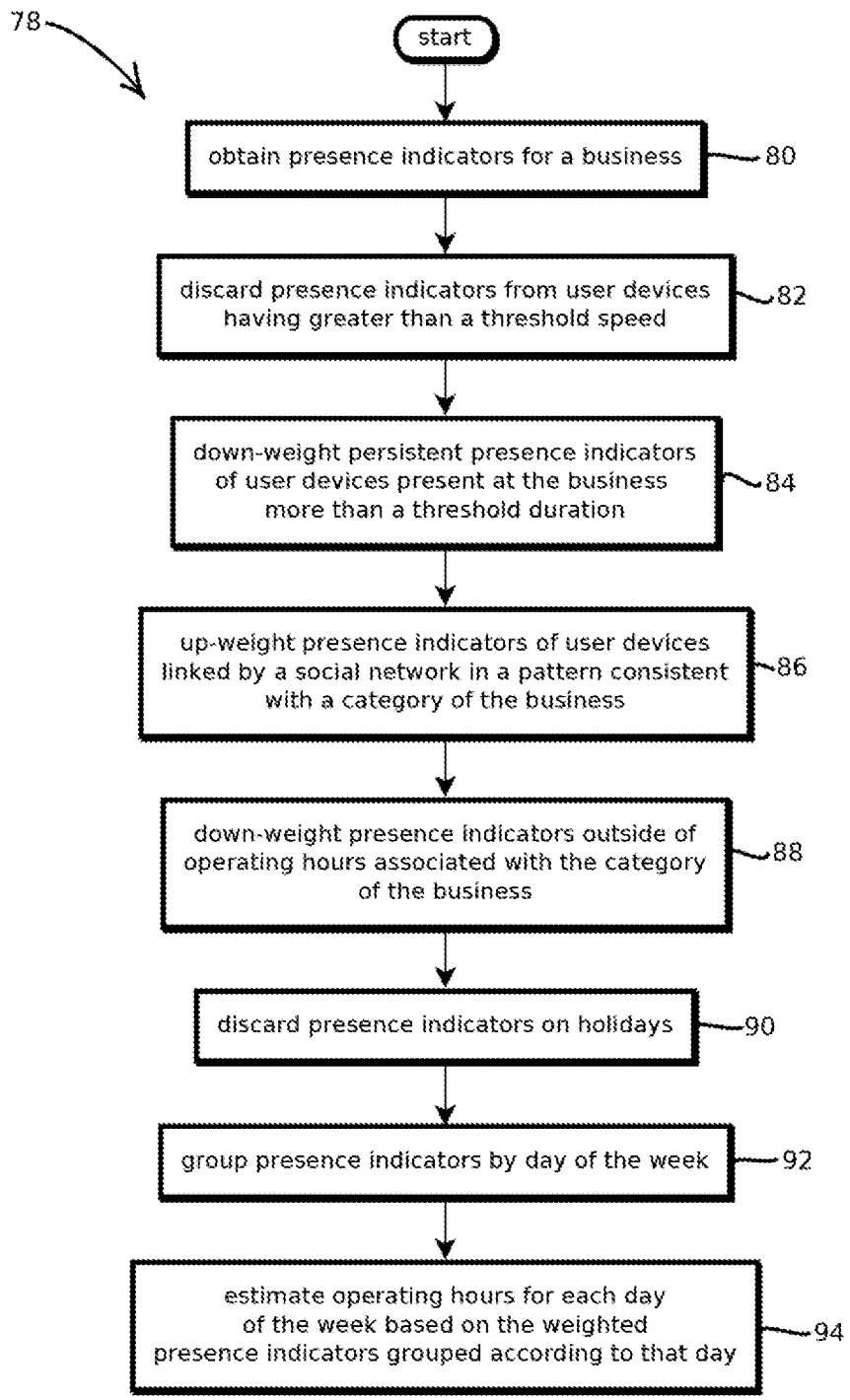
FIG. 4 shows an embodiment of a process for detecting the operating hours of a business based on presence indicators that indicate when a person was likely at the business.

FIG. 4 illustrates an example of process 78 for estimating operating hours of a given business based on timestamps indicating the presence of a user device at the business. Hours are estimated by aggregating (e.g., binning by time) presence indicators according to time of day on each day of the week. Some presence indicators, however, are expected to identify someone as being at a business outside the operating hours of the business, e.g., due to inaccurate location estimation and after-hours employees. To account for these phenomena, certain filters and weightings are applied to the presence indicators before estimating operating hours. The process 78 begins with obtaining presence indicators for a business, as indicated by block 80, e.g., from the timestamp data store 44 of FIG. 2. The process 78 may be repeated for each business in a set of businesses, e.g., all of the businesses for which records are present in the operating hours data store 42.

As noted above, in some cases, a presence indicator arises from a person traveling near the business while walking or driving past, causing an erroneous detection. To reduce the effect of such errors, presence indicators from user devices having greater than a threshold speed are discarded, as indicated by block 82. The speed (or, in some cases, velocity) of the user device is obtained from the user device, along with the wireless-environment data. The threshold may be a walking speed (approximately 5 mph) or a driving speed (approximately 15 mph). The threshold speed may vary depending on direction of movement, e.g., a lower threshold may be applied for movement along a sidewalk or street, as movement in such a direction correlates with movement past, rather than in, a business. Some embodiments discard or down-weight the presence indicator based on trajectory and acceleration, as steady movement on either side of a business is expected to indicate movement past a business, rather than presence within the business.

In some cases, a presence indicator arises from after-hours employees of a business, causing a misleading detection. To reduce this effect, presence indicators are down-weighted for user devices present at the business more than a threshold duration, as indicated by block 84. The time may be total time over an aggregate period, such as one week, or the time may be the duration of a single visit. The size of the threshold duration may be, for example, three hours, on average, per day of the week, or some other duration selected based on differences in patterns of visitation by employees and customers.

Further, some embodiments up-weight presence indicators of user devices linked by a social network in a pattern consistent with a category of the business, as indicated by block 86. For example, certain types of businesses, such as restaurants, are more likely to be frequented by groups of friends, in contrast with other types of businesses, such as doctors offices, which are more likely to be visited by family members, or dry cleaners, which are more likely to be visited by individuals. In some cases, relationships between user devices may be established based on groups of friends or colleagues identified via the above-mentioned social network APIs 28, 30, and 32, which in some cases may include phone calling and email graphs that users permit to be used for aggregate data mining Some embodiments further include down-weighting presence indicators outside of typical operating hours associated with the category of the business, as indicated by step 88. Again, certain categories of businesses, such as bars, tend to be open later or on different days than other types of businesses, such as banks Weightings based on these patterns reduce the effect of erroneous, outlier presence indicators. Statistics of typical hours (e.g., a mean and standard deviation of opening and closing times) may be established based on groups of businesses in the operating hours data store 42 in the same category. Down weightings may be based on the magnitude of the deviation from the mean, e.g., a number of standard deviations away from the mean outside of typical hours, for a given presence indicator. In some embodiments, businesses are further categorized using other metadata about the business that are likely to correlate with business hours: for instance, typical operating hours of bars in a specific metropolitan area, other bars within a one-mile radius of this location, other bars within the same municipal zoning area type, or other businesses within the same mall/shopping center.

Further, presence indicators on holidays are expected to be less reliable, as the absence of user devices at a business does not correlate as strongly with operating hours as during non-holidays. Accordingly, some embodiments discard presence indicators on holidays, as indicated by block 90. Holidays may be manually coded by a human operator, or some embodiments algorithmically infer holidays according to visitations patterns: e.g., on a Tuesday when the average number of visitors across all business in a country/administrative region is significantly below or above the median for a Tuesday, an embodiment may determine that there is a special one-off event of some sort, and down-weight that day's data when computing the Tuesday business hours for any business in the affected area. This approach is expected to account for un-predictable events like high-volume sports, political events, general strikes, and the like.

Embodiments also group presence indicators by day of the week, as indicated by block 92. In some embodiments, the presence indicators are grouped by day of the week for some trailing duration, such as the previous ten Mondays. Grouping by day of the week is expected to account for the tendency of businesses to have different operating hours on different days of the week. The size of the trailing duration is selected in view of tradeoffs between the responsiveness of the process 78 to real changes in business hours and the risk of errant presence indicators causing incorrect estimates of hours.

Finally, the operating hours for each day of the week are estimated based on the weighted, filtered presence indicators grouped according to that day, as indicated by block 94. In some embodiments, the timestamps are binned according to some quantum of time of the day, for example in 15 minute increments, thereby forming bin counts for seven histograms of presence indicators for a business, one for each day of the week (though a histogram is not necessarily displayed). Operating hours then are estimated based on attributes of these histograms. For example, opening and closing hours may be detected when the weighted count of presence indicators drops below the 10th percentile of historical indicator counts, or below 20% of the median historical indicator count. Some embodiments may detect operating hours based on a first or second derivative of the histogram, for example when a rate of decrease exceeds some threshold at the end of the day or a rate of increase exceeds some threshold at the beginning of the day. In some cases, the operating hours may be estimated along with a confidence score based on the amount of data available and the variability of the data. Some embodiments adjust the thresholds based on such a confidence score, e.g., estimating operating hours more conservatively when confidence is low to reduce the risk of a customer arriving when the business is closed. The estimated operating hours then are stored in an operating-hours data store, such as the data store 42 of FIG. 2.

The process of FIG. 4 is expected to yield relatively accurate estimates of the operating hours of a business, without incurring the labor costs associated with a human being contacting the business to request the operating hours on a regular basis. Thus, some embodiments yield a low-cost, scalable, relatively accurate, relatively up-to date record of the operating hours of businesses, though the techniques described herein are not limited to systems that provide all these benefits, as various engineering trade-offs are envisioned that would target different objectives.

Figure 5:
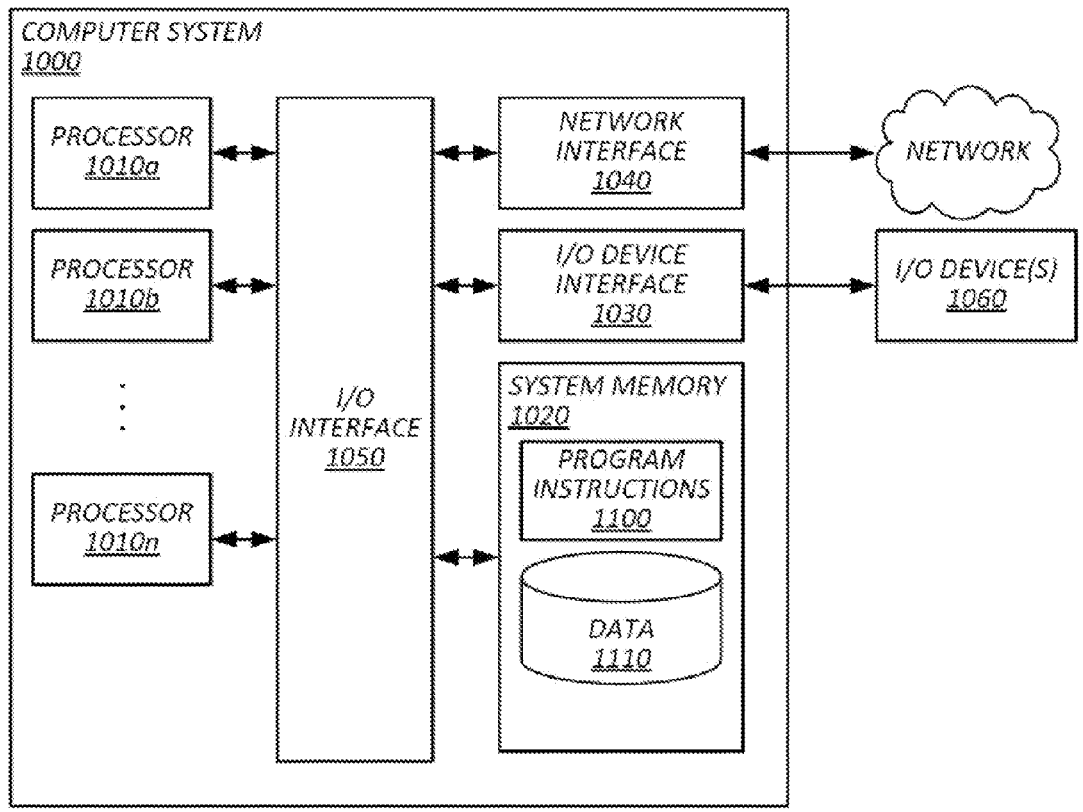
FIG. 5 is an example of a computer system by which embodiments are implemented.

FIG. 5 is a diagram that illustrates an exemplary computing system 1000 in accordance with embodiments of the present technique. Various portions of systems and methods described herein, may include or be executed on one or more computer systems similar to computing system 1000. Further, processes and modules described herein may be executed by one or more processing systems similar to that of computing system 1000.

Computing system 1000 may include one or more processors (e.g., processors 1010a-1010n) coupled to system memory 1020, an input/output I/O device interface 1030, and a network interface 1040 via an input/output (I/O) interface 1050. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1000. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1020). Computing system 1000 may be a uni-processor system including one processor (e.g., processor 1010a), or a multi-processor system including any number of suitable processors (e.g., 1010a-1010n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 1000 may include a plurality of computing devices (e.g., distributed computer systems) to implement various processing functions.

I/O device interface 1030 may provide an interface for connection of one or more I/O devices 1060 to computer system 1000. I/O devices may include devices that receive input (e.g., from a user) or output information (e.g., to a user). I/O devices 1060 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computer system 1000 through a wired or wireless connection. I/O devices 1060 may be connected to computer system 1000 from a remote location. I/O devices 1060 located on remote computer system, for example, may be connected to computer system 1000 via a network and network interface 1040.

Network interface 1040 may include a network adapter that provides for connection of computer system 1000 to a network. Network interface may 1040 may facilitate data exchange between computer system 1000 and other devices connected to the network. Network interface 1040 may support wired or wireless communication. The network may include an electronic communication network, such as the Internet, a local area network (LAN), a wide area network (WAN), a cellular communications network, or the like.

System memory 1020 may be configured to store program instructions 1100 or data 1110. Program instructions 1100 may be executable by a processor (e.g., one or more of processors 1010a-1010n) to implement one or more embodiments of the present techniques. Instructions 1100 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1020 may include a non-transitory computer readable storage medium that may have program instructions stored thereon that are executable by a computer processor (e.g., one or more of processors 1010a-1010n) to cause the subject matter and the functional operations described herein. A memory (e.g., system memory 1020) may include a single memory device and/or a plurality of memory devices (e.g., distributed memory devices).

I/O interface 1050 may be configured to coordinate I/O traffic between processors 1010a-1010n, system memory 1020, network interface 1040, I/O devices 1060, and/or other peripheral devices. I/O interface 1050 may perform protocol, timing, or other data transformations to convert data signals from one component (e.g., system memory 1020) into a format suitable for use by another component (e.g., processors 1010a-1010n). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1000 or multiple computer systems 1000 configured to host different portions or instances of embodiments. Multiple computer systems 1000 may provide for parallel or sequential processing/execution of one or more portions of the techniques described herein.

Those skilled in the art will appreciate that computer system 1000 is merely illustrative and is not intended to limit the scope of the techniques described herein. Computer system 1000 may include any combination of devices or software that may perform or otherwise provide for the performance of the techniques described herein. For example, computer system 1000 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via intercomputer communication. Some or all of the system components or data structures may also be stored (e.g., as instructions or structured data) on a computer-accessible medium or a portable article to be read by an appropriate drive, various examples of which are described above.

It should be understood that the description and the drawings are not intended to limit the invention to the particular form disclosed, but to the contrary, the intention is to cover all modifications, equivalents, and alternatives falling within the spirit and scope of the present invention as defined by the appended claims. Further modifications and alternative embodiments of various aspects of the invention will be apparent to those skilled in the art in view of this description.

Accordingly, this description and the drawings are to be construed as illustrative only and are for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed or omitted, and certain features of the invention may be utilized independently, all as would be apparent to one skilled in the art after having the benefit of this description of the invention. Changes may be made in the elements described herein without departing from the spirit and scope of the invention as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Further, unless otherwise indicated, statements that one value or action is "based on" another condition or value encompass both instances in which the condition or value is the sole factor and instances in which the condition or value is one factor among a plurality of factors. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device.

What is claimed is the following:

1. A method of ascertaining the operating hours of a business, the method comprising:
    obtaining wireless-environment data indicative of the location of a business and a timestamp indicative of when the wireless-environment data was obtained from one or more wireless signals, the wireless-environment data being indicative of a wireless environment near premises of a business;
    determining that a user device is located at the business responsive to both the wireless-environment data and wireless-environment data received from other user devices having timestamps corresponding to times that users of the other user devices checked-in to the business via a social network, completed a financial transaction at the business location, had a calendar entry identifying the business, or made an on-line mention of the business;
    storing the timestamp in a timestamp data store, the timestamp data store also storing a plurality of timestamps indicative of times at which other user devices were at the business;
    estimating operating hours of the business responsive to the stored timestamps; and
    storing the estimated operating hours in a business-hours data store.

2. The method of claim 1, wherein determining that the user device is located at the business comprises:
    determining that the user device is located at the business by comparing cellular signals and wireless hotspot signals received by the user device to cellular signals and wireless hotspot received by checked-in user devices.

3. The method of claim 1, wherein estimating operating hours of the business comprises:
    weighting the timestamp based on a speed of a user device from which the timestamp was received.

4. The method of claim 1, wherein estimating operating hours of the business comprises:
    identifying a type of business of which the business is an instance;
    obtaining operating hours corresponding with the type of business;
    determining that the timestamp is outside the operating hours corresponding to the type of business; and
    down-weighting the timestamp.

5. The method of claim 1, wherein estimating operating hours of the business comprises:
    weighting the timestamp based on a duration of time the user device is at the business.

6. The method of claim 1, wherein estimating operating hours of the business comprises:
    weighting the timestamp based on a rate of occurrence of receiving timestamps from the user device when the user device is located at the business.

7. The method of claim 1, wherein estimating operating hours of the business comprises:
    identifying a type of business of which the business is an instance;
    obtaining a pattern of social-network links corresponding with the type of business;
    determining that a concurrent group of the stored timestamps are linked to one another through a social-network consistent with the obtained pattern; and
    up-weighting the concurrent group of timestamps responsive to the determination.

8. The method of claim 1, comprising:
    refining parameters by which the user device is determined to be located at the business responsive to a plurality of training records, each training record comprising an identifier of a business to which at least one user device checked-in, and wireless-environment data from the check-in user device.

9. A system for ascertaining the operating hours of a business, the system comprising:
    one or more processors; and
    memory storing instructions that when executed by the one or more processors causes the one or more processors to perform steps comprising:
        obtaining wireless-environment data indicative of the location of business and a timestamp indicative of when the wireless-environment data was obtained from one or more wireless signals, the wireless-environment data being indicative of a wireless environment near premises of a business;
determining that a user device is located at the business responsive to both the wireless-environment data and wireless-environment data received from other user devices having timestamps corresponding to times that users of the other user devices checked-in to the business via a social network, completed a financial transaction at the business location, had a calendar entry identifying the business, or made an on-line mention of the business;
storing the timestamp in a timestamp data store, the timestamp data store also storing a plurality of timestamps indicative of times at which other user devices were at the business;
estimating operating hours of the business responsive to the stored timestamps; and
storing the estimated operating hours in a business-hours data store.

10. The system of claim 9, wherein determining that the user device is located at the business comprises:
determining that the user device is located at the business by comparing cellular signals and wireless hotspot signals received by the user devices to cellular signals and wireless hotspot received by checked in user devices.

11. The system of claim 9, wherein estimating operating hours of the business comprises:
weighting the timestamp based on a speed of a user device from which the timestamp was received.

12. The system of claim 9, wherein estimating operating hours of the business comprises:
identifying a type of business of which the business is an instance;
obtaining operating hours corresponding with the type of business;
determining that the timestamp is outside the operating hours corresponding to the type of business; and
down-weighting the timestamp.

13. The system of claim 9, wherein estimating operating hours of the business comprises:
weighting the timestamp based on a duration of time the user device is at the business.

14. The system of claim 9, wherein estimating operating hours of the business comprises:
weighting the timestamp based on a rate of occurrence of receiving timestamps from the user device when the user device is located at the business.

15. The system of claim 9, wherein estimating operating hours of the business comprises:
identifying a type of business of which the business is an instance;
obtaining a pattern of social-network links corresponding with the type of business;
determining that a concurrent group of the stored timestamps are linked to one another through a social-network consistent with the obtained pattern; and
up-weighting the concurrent group of timestamps responsive to the determination.

16. The system of claim 9, the steps further comprising:
refining parameters by which the user device is determined to be located at the business responsive to a plurality of training records, each training record comprising an identifier of a business to which at least one user device checked-in, and wireless-environment data from the check-in user device.

17. A tangible, non-transitory machine-readable medium storing instructions that when executed cause one or more computers to perform a process comprising:
obtaining wireless-environment data indicative of the location of business and a timestamp indicative of when the wireless-environment data was obtained from one or more wireless signals, the wireless-environment data being indicative of a wireless environment near premises of a business;
determining that a user device is located at the business responsive to both the wireless-environment data and wireless-environment data received from other user devices having timestamps corresponding to times that users of the other user devices checked-in to the business via a social network, completed a financial transaction at the business location, had a calendar entry identifying the business, or made an on-line mention of the business;
storing the timestamp in a timestamp data store, the timestamp data store also storing a plurality of timestamps indicative of times at which other user devices were at the business;
estimating operating hours of the business responsive to the stored timestamps; and
storing the estimated operating hours in a business-hours data store.

18. The machine-readable medium of claim 17, wherein determining that the user device is located at the business comprises:
determining that the user device is located at the business by comparing cellular signals and wireless hotspot signals received by the user device to cellular signals and wireless hotspot received by checked in user devices.

19. The machine-readable medium of claim 17, wherein estimating operating hours of the business comprises:
weighting the timestamp based on a speed of a user device from which the timestamp was received.

20. The machine-readable medium of claim 17, wherein estimating operating hours of the business comprises:
identifying a type of business of which the business is an instance;
obtaining operating hours corresponding with the type of business;
determining that the timestamp is outside the operating hours corresponding to the type of business; and
down weighting the timestamp.

21. The machine-readable medium of claim 17, wherein estimating operating hours of the business comprises:
weighting the timestamp based on a duration of time the user device is at the business.

22. The machine-readable medium of claim 17, wherein estimating operating hours of the business comprises:
weighting the timestamp based on a rate of occurrence of receiving timestamps from the user device when the user device is located at the business.

23. The machine-readable medium of claim 17, wherein estimating operating hours of the business comprises:
identifying a type of business of which the business is an instance;
obtaining a pattern of social-network links corresponding with the type of business;
determining that a concurrent group of the stored timestamps are linked to one another through a social-network consistent with the obtained pattern; and
up-weighting the concurrent group of timestamps responsive to the determination.

24. The machine-readable medium of claim 17, the steps further comprising:

refining parameters by which the user device is determined to be located at, the business responsive to a plurality of training records, each training record comprising an identifier of a business to which at least one other device checked-in, and wireless-environment data from the check-in user device.

* * * * *